US010331460B2

(12) United States Patent
Kommineni et al.

(10) Patent No.: US 10,331,460 B2
(45) Date of Patent: Jun. 25, 2019

(54) UPGRADING CUSTOMIZED CONFIGURATION FILES

(71) Applicant: VMWARE, INC., Palo Alto, CA (US)

(72) Inventors: Shankar Kommineni, Bangalore (IN); Vinay Vivekananda, Bangalore (IN); Reghuram Vasanthakumari, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 203 days.

(21) Appl. No.: 15/405,338

(22) Filed: Jan. 13, 2017

(65) Prior Publication Data

US 2018/0088971 A1    Mar. 29, 2018

(30) Foreign Application Priority Data

Sep. 29, 2016    (IN) .............................. 201641033264

(51) Int. Cl.
*G06F 9/00* (2006.01)
*G06F 9/445* (2018.01)
*G06F 8/65* (2018.01)

(52) U.S. Cl.
CPC ............ *G06F 9/44505* (2013.01); *G06F 8/65* (2013.01)

(58) Field of Classification Search
CPC ................................ G06F 9/44505; G06F 8/65
USPC ...................... 711/147; 709/219, 220; 718/1; 707/636, 758; 715/773, 735
See application file for complete search history.

(56) References Cited

U.S. PATENT DOCUMENTS

| 6,766,334 B1* | 7/2004 | Kaler ........................ G06F 8/71 |
| 7,698,845 B2* | 4/2010 | Hochstrate .............. F41A 17/72 42/69.01 |
| 8,060,703 B1* | 11/2011 | Desai ..................... G06F 12/023 711/147 |
| 8,577,940 B2* | 11/2013 | Tormasov ......... G06F 17/30165 707/831 |
| 8,656,386 B1* | 2/2014 | Baimetov ........... G06F 9/45558 709/219 |
| 8,683,352 B2* | 3/2014 | Scherpa ............ G06F 17/30126 715/753 |
| 2002/0103994 A1* | 8/2002 | Morrison ............ G06F 9/44505 713/1 |
| 2004/0062168 A1* | 4/2004 | Kobari ............... G11B 20/1426 369/59.24 |
| 2004/0187110 A1* | 9/2004 | Boyfield ................. G06F 16/86 718/100 |
| 2005/0283575 A1* | 12/2005 | Kobayashi ............ G06F 3/0604 711/147 |

(Continued)

FOREIGN PATENT DOCUMENTS

WO    WO-2008092989 A1 * 8/2008 ......... G06F 9/44505

*Primary Examiner* — Aurel Prifti
(74) *Attorney, Agent, or Firm* — Thomas | Horstemeyer, LLP

(57) ABSTRACT

Upgrading a customized configuration file can include replacing the configuration property value of the upgraded configuration file with the corresponding configuration property value of the customized configuration file in response to the configuration property value of the upgraded configuration file being the same as the corresponding configuration property value of the previous version configuration file and in response to the configuration property value of the upgraded configuration file being different than the corresponding configuration property value of the customized configuration file.

18 Claims, 4 Drawing Sheets

(56) References Cited

U.S. PATENT DOCUMENTS

| | | | | |
|---|---|---|---|---|
| 2006/0130047 A1* | 6/2006 | Burugapalli | G06F 8/71 | 717/170 |
| 2006/0184937 A1* | 8/2006 | Abels | G06F 8/65 | 718/1 |
| 2006/0288055 A1* | 12/2006 | Johnson | G06F 8/60 | |
| 2007/0162521 A1* | 7/2007 | Raghunath | G06F 9/44563 | |
| 2007/0257715 A1* | 11/2007 | Semerdzhiev | G06F 19/00 | 327/141 |
| 2009/0112824 A1* | 4/2009 | Fu | G06F 16/9577 | |
| 2011/0078680 A1* | 3/2011 | Lagergren | G06F 9/5077 | 718/1 |
| 2012/0158920 A1* | 6/2012 | Yang | G06F 8/61 | 709/220 |
| 2013/0275375 A1* | 10/2013 | Nickolov | G06F 9/4856 | 707/636 |
| 2014/0108440 A1* | 4/2014 | Nos | G06F 16/1873 | 707/758 |
| 2014/0331147 A1* | 11/2014 | Jain | G06F 3/0484 | 715/745 |
| 2015/0301730 A1* | 10/2015 | Xiang | G06F 3/0488 | 715/773 |
| 2016/0041837 A1* | 2/2016 | Rangayya | G06F 9/45558 | 718/1 |
| 2016/0055196 A1* | 2/2016 | Collins | G06F 17/2211 | 707/690 |
| 2016/0094382 A1* | 3/2016 | Schmidt | H04L 41/082 | 715/735 |
| 2018/0351870 A1* | 12/2018 | Chen | H04L 47/24 | |

* cited by examiner

| CASE | ORIGINAL CONFIGURATION (206) | CUSTOM CONFIGURATION (214) | UPGRADE CONFIGURATION (222) | FINAL CONFIGURATION (220) |
|---|---|---|---|---|
| 1 | X | X | X | X |
| 2 | X | X | Y | Y |
| 3 | X | Y | X | Y |
| 4 | X | Y | Y | Y |
| 5 | X | Y | Z | Z |

*Fig. 2*

UPGRADING CUSTOMIZED CONFIGURATION FILES

RELATED APPLICATION

Benefit is claimed under 35 U.S.C. 119(a)-(d) to Foreign Application Serial No. 201641033264 filed in India entitled "UPGRADING CUSTOMIZED CONFIGURATION FILES", filed on Sep. 29, 2016, by VMware, Inc., which is herein incorporated in its entirety by reference for all purposes.

BACKGROUND

Software products typically include configuration files. Configuration files can be used with applications, services, processes and operating systems, among others. The configuration file can define the behavior of the application, service, process, operating system, etc. Some configuration files are used at startup while others are read periodically to check for changes.

A configuration file includes configuration property values that define various parameters and initial settings. Examples of configuration file properties include IP address of an endpoint, a number of threads to be started for a service, a number of connections allowed for a particular database, etc. Some applications provide tools to create or customize the configuration property values of a configuration file (e.g., via a graphical user interface or text editor).

BRIEF DESCRIPTION OF THE DRAWINGS

FIG. 2 is a block diagram of a truth table for a three-way merge algorithm according to a number of embodiments of the present disclosure.

DETAILED DESCRIPTION

Figure 1:
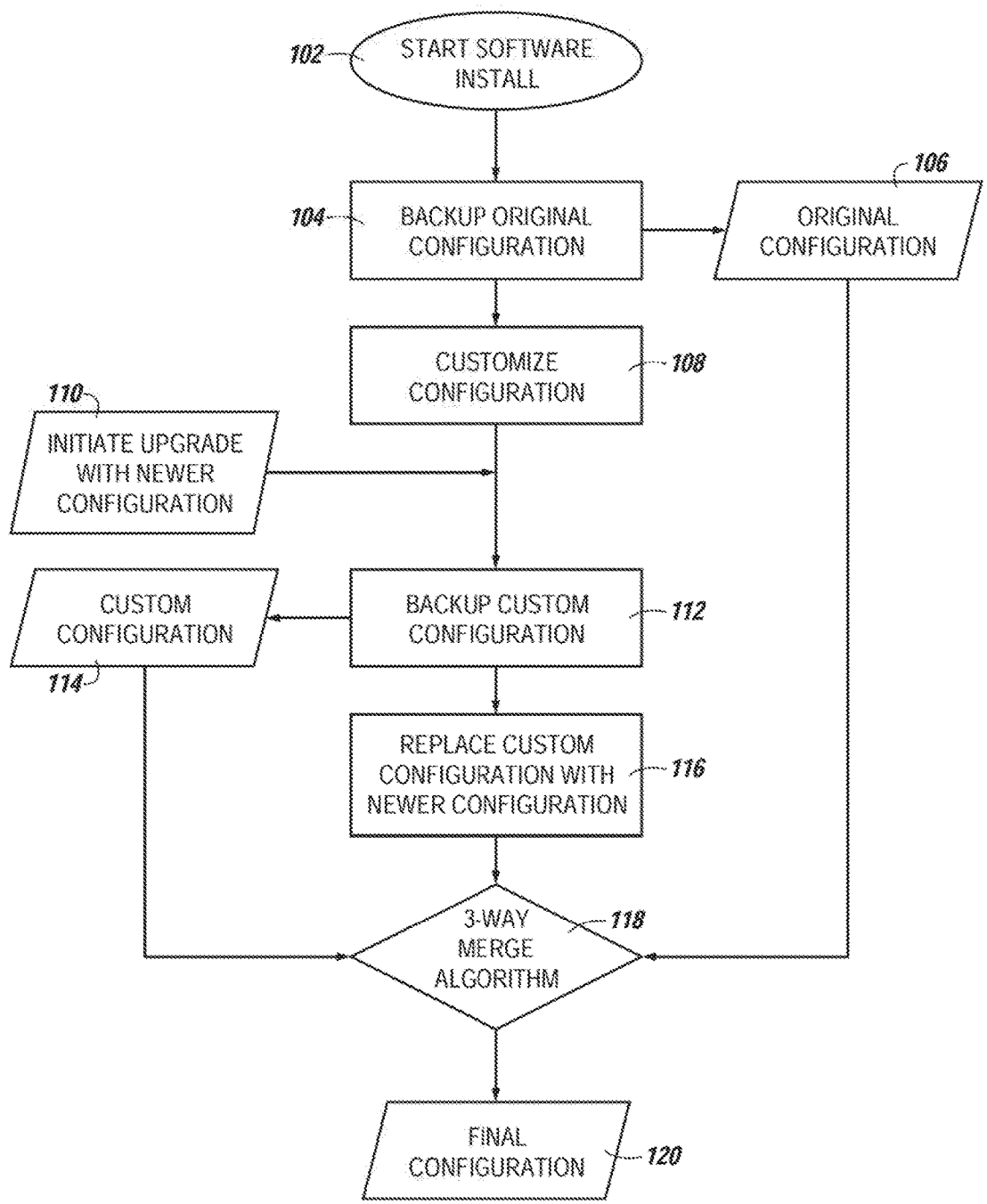
FIG. 1 is a flow chart illustrating a method of upgrading a customized configuration file according to a number of embodiments of the present disclosure.

In many instances, some of the configuration property values in a configuration file are customized by a user or administrator based on their computing environment. For example, a configuration property comprising an IP address for a particular endpoint may be customized with a particular configuration property value (e.g., a specific IP address). When a configuration property value is customized, the configuration file may be referred to as a customized configuration file. The previous version configuration file (in some instances, an original configuration file) can be customized with different configuration property values than were included in the previous version configuration file.

The previous version configuration file may include default configuration property values. In some instances, a particular configuration property value may be empty (null) in the previous version configuration file. In either case, the configuration property value may be customized (either added or changed) to suit the needs of a particular computing environment.

Configuration files as a whole may be upgraded either independently or as part of an upgrade to the software underlying the configuration file (e.g., application, service, process, operating system, etc.). For example, the upgrade can be a release of a new version of the software. However, if the upgraded configuration file replaces a customized configuration file, the customized configuration property values may be lost or replaced. This can have the undesirable side effect of forcing the user or administrator to have to manually change the configuration property values back to their preferred customized values.

Some previous approaches to retaining such custom configuration settings may apply a two-way merge mechanism. However, such approaches cannot automatically merge customized configuration property values correctly when the default value changes during multiple releases of the configuration file. With a two-way merge, there is no way to detect whether the configuration property value changes as part of a newer version of the configuration file or as a result of it being customized in a previous version configuration file. In such instances, the configuration file, or the application underlying the configuration file, would have to explicitly handle the reconfiguration in the code in order to retain the customized configuration. In contrast, at least one embodiment of the present disclosure can perform a three-way merge of the upgraded configuration file, a previous version configuration file, and the customized configuration file to yield a customized upgraded configuration file that retains the customized configuration after an upgrade when appropriate. As used herein, "configuration file" is inclusive of entries (such as key and value pairs) in a registry such as Windows Registry.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 214 in FIG. 2. As used herein, the designators "M" and "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a flow chart illustrating a method of upgrading a customized configuration file according to a number of embodiments of the present disclosure. At 102, a software installation can begin. The software can include a configuration file. In some embodiments, the configuration file can be a previous version configuration file (with respect to a later-customized configuration file), such as an original configuration file. Although an original configuration file is used as an example, embodiments are not so limited. The "original" configuration file represents any prior version configuration file.

At 104, the original configuration 106 can be backed up. Backing up the original configuration file 106 can include storing a copy of the original configuration file 106 and/or storing the configuration property values contained in the original configuration file 106. Backing up the original configuration file 106 can preserve the configuration property values contained therein for a later three-way merge 118 with other configuration property values.

At 108, the configuration file can be customized. Customizing the configuration file can include receiving customized configuration property values and replacing corresponding configuration property values in the original configuration file therewith. The customized configuration property values can be received from a user, an administrator, or another source. The customized configuration property values can be specific to a computing environment in which the configuration file will be used, as opposed to what may be generic configuration property values in the original configuration file. In some embodiments, the original configuration file can include one or more null configuration property values. The configuration property values that are null in the original configuration file may not be needed in all computing environments, but may be customized for particular computing environments where specifying such values is advantageous. For example, a default configuration property value for a maximum number of connections to a database may not be provided in an original configuration file such that the default is an unlimited number of connections. However, in a particular computing environment, it may be desirable to limit the number of connections to a particular database to preserve its quality of service.

At 110, an upgrade of the configuration file with a new, upgraded configuration file can be initiated. In at least one embodiment, the upgraded configuration file can be included in a new software release to which the configuration file pertains. In some embodiments, the upgraded configuration file can be a standalone upgrade (e.g., without upgrading the software underlying the configuration file). In response to the upgrade being initiated, the customized configuration file 114 can be backed up at 112. Backing up the customized configuration file 114 can preserve the configuration property values contained therein for a later three-way merge 118 with other configuration property values. After the customized configuration file is backed up, the upgraded configuration file can replace the customized configuration file at 116. Although backing up the original configuration file and the customized configuration file is described herein, such backup is not mandatory for all embodiments.

At 118 a three-way merge can be performed. In at least one embodiment, the three-way merge can be performed on the backed up original configuration file 106 (or configuration property values therefrom), the backed up custom configuration file 114 (or configuration property values therefrom) and the upgraded configuration file (e.g., in runtime of the upgraded configuration file). The algorithm for the three-way merge is described in more detail with respect to FIG. 2. As a result of the three-way merge algorithm, the customized configuration file can be upgraded while preserving the customization, where appropriate. For example, at least one customized configuration property value from the customized configuration file can replace a corresponding configuration property value from the upgraded configuration file to yield the final configuration file 120. The final configuration file 120 is the state oaf the configuration file after the three-way merge is performed. As used herein, the state of the configuration file refers to the specific configuration property values contained therein.

FIG. 2 is a block diagram of a truth table for a three-way merge algorithm according to a number of embodiments of the present disclosure. The table includes five examples of cases illustrating application of the three-way merge algorithm to corresponding configuration property values of the original configuration file 206 (the previous version configuration file), the customized configuration file 214, and the upgraded configuration file 222 to yield the final configuration file 220 (the customized upgraded configuration file). A configuration file can include more than one configuration property value because it can have different configuration property values for different configuration properties. As such, the configuration property values for each case illustrated in FIG. 2 are referred to as "corresponding" because they correspond to the same configuration property. The different cases illustrated in FIG. 2 could all correspond to different configuration properties of the same configuration file. For example, case 1 could be an IP address, case 2 could be a maximum number of database connections, case 3 could be a number of threads to be started for a service, case 4 could be a path to a directory used to store public key data, and case 5 could be a definition of a port used by a communication interface. Embodiments are not limited to these specific examples. Or, the different cases illustrated in FIG. 2 could correspond to the same configuration property of different configuration files. For example, cases 1-5 are each respective IP addresses for different configuration files.

In the first case, the corresponding configuration property values of the original configuration file 206, the customized configuration file 214, and the upgraded configuration file 222 are all the same (e.g., "X"). When the configuration property value is static as such (e.g., where there is no customized configuration), then the final configuration property value does not change. In other words, the configuration property value of the upgraded configuration file 222 can be maintained for the final configuration file 220 (e.g., "X"). The configuration property value of the upgraded configuration file 222 is referred to as being maintained because it is the configuration property value that is in place at runtime when the three-way merge takes place, as described above.

In the second case, the corresponding configuration property values of the original configuration file 206 and the customized configuration file 214 are the same (e.g., "X"), but the configuration property value of the upgraded configuration file 222 is different (e.g., "Y") than both the original configuration file 206 and the custom configuration file 214. This case represents a static configuration property value (e.g., where there is no customized configuration), however, the configuration property value is changed by the new version. In this case, the configuration property value of the upgraded configuration file can be maintained for the final configuration file 220 (e.g., "Y"). Because there was no custom configuration, it is presumed that the user would want to adopt the upgraded value.

In the third case, the corresponding configuration property value of the original configuration file 206 (e.g., "X") and the configuration property value of the customized configuration file 214 (e.g., "V") are different. This indicates that the customized configuration file has indeed been customized for this particular configuration property value. The configuration property value of the upgraded configuration file 222 (e.g., "X") is the same as that of the original configuration file 206, but different than that of the customized configuration file 214. This indicates that the new version did not update this particular configuration property value. As such, it is presumed that the user would prefer to keep the customized configuration property value for the computing environment. Thus, the configuration property value of the upgraded configuration file 222 is replaced with the configuration property value of the customized configuration file 214 to yield the configuration property value of the final configuration file 220 (e.g., "Y").

In the fourth case, the corresponding configuration property value of the original configuration file 206 (e.g., "X") and the configuration property value of the customized configuration file 214 (e.g., "Y") are different. This indicates that the customized configuration file has indeed been customized for this particular configuration property value. The configuration property value of the upgraded configuration file 222 (e.g., "Y") is different than that of the original configuration file 206, but the same as the customized configuration file 214. This may indicate that the customized configuration property value set by the user was adopted by the developer and built into the new version. In any event, for this case, the configuration property value of the updated configuration file 222 can be maintained to yield the same configuration property value for the final configuration file 220 (e.g., "Y"). This may be regarded as preserving the customization of the user.

In the fifth case, each of the corresponding configuration property values of the original configuration file 206 (e.g., "X"), the customized configuration file 214 (e.g., "Y"), and the upgraded configuration file 222 (e.g., "Z") are different. This indicates that the customized configuration file has been customized for this particular configuration property value, but it was also updated differently in the new version. Accordingly, it may be presumed that the user would prefer to use the further updated configuration property value (e.g., with the new version of the software). As such, the configuration property value of the upgraded configuration file 222 can be maintained as the configuration property value of the final configuration file 220 (e.g., "Z").

A method of upgrading a customized configuration file can include replacing the customized configuration file with an upgraded configuration file and comparing configuration property values of the upgraded configuration file with corresponding configuration property values of a previous version configuration file and the customized configuration file. The method can include replacing a first configuration property value of the upgraded configuration file in response to the comparison indicating that a first corresponding configuration property value of the previous version configuration file is the same as the first configuration property value of the upgraded configuration file and indicating that a first corresponding configuration property value of the customized configuration file is different than the first configuration property value of the upgraded configuration file. The method can include maintaining a second configuration property value of the upgraded configuration file in response to the comparison indicating that a second corresponding configuration property value of the previous version configuration file being the same as a second corresponding configuration property value of the customized configuration file and indicating that the second configuration property value of the upgraded configuration file being different than the second corresponding configuration property values of the previous version and the customized configuration files.

The method can further include maintaining a third configuration property value of the upgraded configuration file in response to the comparison indicating that the third configuration property value of the upgraded configuration file is the same as a third corresponding configuration property value of the customized configuration file and indicating that the third configuration property value of the upgraded configuration file is different than a third corresponding configuration property value of the previous version configuration file. The method can further include maintaining a fourth configuration property value of the upgraded configuration file in response to the comparison indicating that a fourth corresponding configuration property value of the customized configuration file is different than the fourth configuration property value of the upgraded configuration file, indicating that a fourth corresponding configuration property value of the previous version configuration file is different than the fourth configuration property value of the upgraded configuration file, and indicating that the fourth corresponding configuration property value of the customized configuration file is different than the fourth corresponding configuration property value of the previous version configuration file. The method can further include maintaining a fifth configuration property value of the upgraded configuration file in response to the comparison indicating that the fifth configuration property value of the upgraded configuration file is the same as a fifth corresponding configuration property value of the previous version configuration file and the same as a fifth corresponding configuration property value of the customized configuration file.

The method can further include customizing the previous version configuration file after backing up the previous version configuration file, backing up the customized configuration file prior to replacing the customized configuration file with the upgraded configuration file, and performing the comparison using the backup of the previous version configuration file, the backup of the customized configuration file, and the upgraded version of the configuration file. Performing the comparison can comprise performing the comparison in runtime of an application that references the customized configuration file. Customizing the previous version configuration file can comprise receiving and setting at least one configuration property value for the configuration file.

Figure 3:
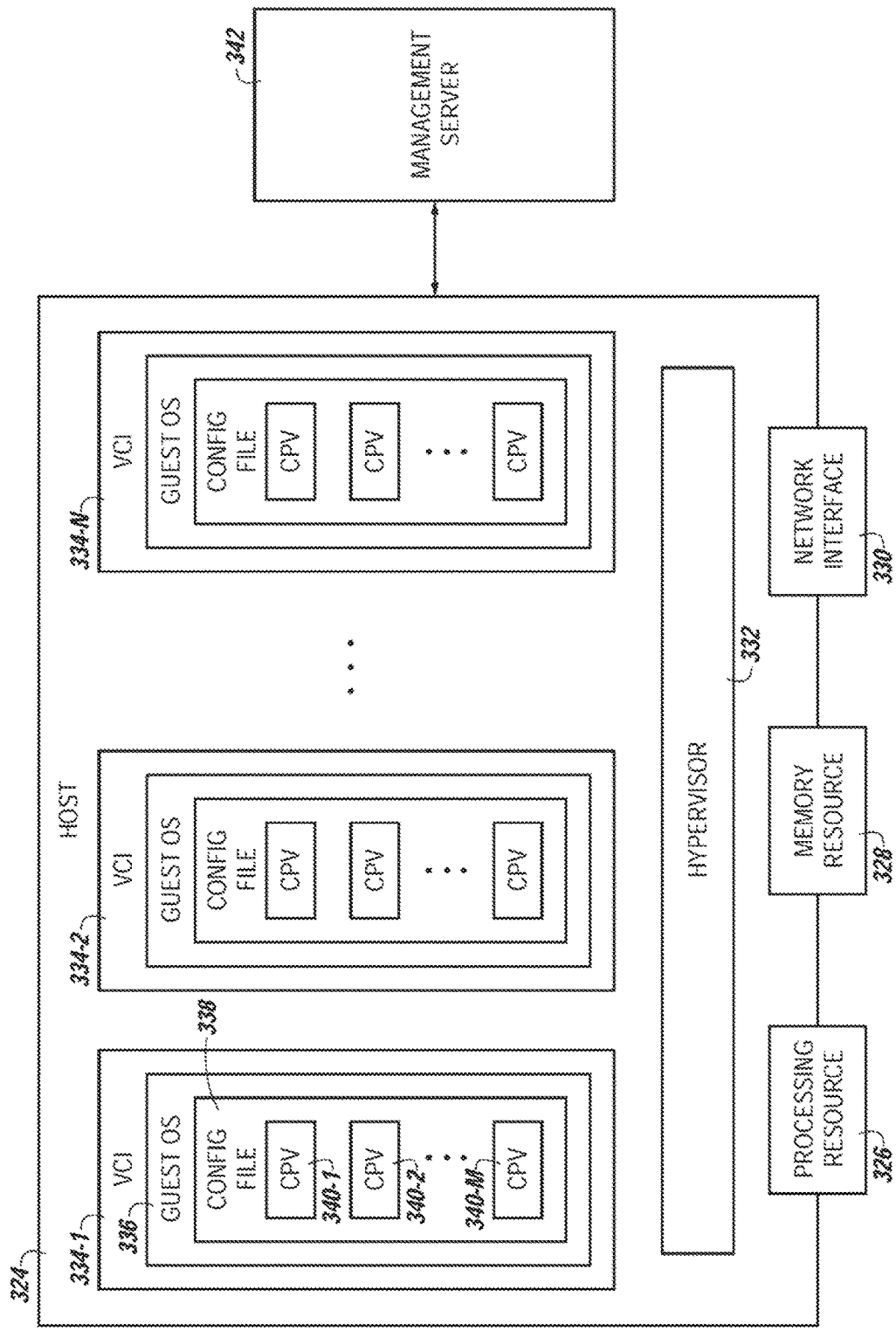
FIG. 3 is a block diagram of a system for upgrading a customized configuration file according to a number of embodiments of the present disclosure.

FIG. 3 is a block diagram of a system for upgrading a customized configuration file according to a number of embodiments of the present disclosure. The system can include a host 324 with processing resources 326 (e.g., a number of processors), memory resources 328, and a network interface 330. The host 324 can be coupled to a management server 342. Although not specifically illustrated, the management server can include processing resources, memory resources, and a network interface.

The host 324 can be included in a software defined data center. A data center is a facility that houses servers, data storage devices, and/or other associated components such as backup power supplies, redundant data communications connections, environmental controls such as air conditioning and/or tire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 324 can incorporate a hypervisor 332 that can execute a first number of virtual computing instances (VCIs) 334-1, 334-2, . . . , 334-N (referred to generally as VCIs 334). VCIs, such as virtual machines, virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications.

The term "virtual computing instance" covers a range of computing functionality. The term "virtual machine" refers generally to an isolated user space instance, which can be executed within a virtualized environment. Other technologies aside from hardware virtualization can provide isolated user space instances, also referred to as data compute nodes. Data compute nodes may include non-virtualized physical hosts, virtual machines (VMs), containers that run on top of a host operating system without a hypervisor or separate operating system, and/or hypervisor kernel network interface modules, among others. Hypervisor kernel network interface modules are non-VM data compute nodes that include a network stack with a hypervisor kernel network interface and receive/transmit threads.

The VCIs 334 can be provisioned with processing resources 326 and/or memory resources 328 and can communicate via the network interface 330. The processing resources 326 and the memory resources 328 provisioned to the VCIs 334 can be local an or remote to the host 324. For example, in a software defined data center, the VCIs 334 can be provisioned with resources that are generally available to the software defined data center and not tied to any particular hardware device. By way of example, the memory resources 328 can include volatile and/or non-volatile memory available to the VCIs 334. The VCIs 334 can be moved to different hosts (not specifically illustrated), such that a different hypervisor manages the VCIs 334.

VCIs 334, in some embodiments, operate with their own guest operating systems 336 on the host 324 using processing resources 326, memory resources 328, and a network interface 330 of the host 324 virtualized by visualization software (e.g., a hypervisor 332, virtual machine monitor, etc.). The tenant (i.e., the owner of the VCI 334) can choose which applications to operate on top of the guest operating system 336. Some containers, on the other hand, are constructs that run on top of a host operating system without the need for a hypervisor or separate guest operating system. The host operating system can use name spaces to isolate the containers from each other and therefore can provide operating system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

The guest operating systems 336 can include configuration files 338 as described herein. The configuration files 338 can include a plurality of configuration property values 340-1, 340-2, . . . 340-M (referred to generally as configuration property values 340). The management server 342 can be generally responsible for maintaining and distributing software for the VCIs 334 on hosts 324 managed by the management server 342. In some embodiments, the management server can manage many hosts 324 and many VCIs 334 (e.g., hundreds or thousands). The management server 342 can be configured to provide an upgraded configuration file to the hypervisor 332 for a guest operating system 336 running on each of the VCIs 336. The hypervisor 332 can be configured to replace a respective customized configuration file with the upgraded configuration file for each of the VCIs 336. The hypervisor 332 can be configured to perform a respective three-way merge of the upgraded configuration file, a previous version configuration file, and the respective customized configuration file for each of the VCIs 336 as described with respect to FIG. 2. For example, the hypervisor 332 can be configured to compare configuration property values of the upgraded configuration file with corresponding configuration property values of a previous version configuration file and the respective customized configuration files. The hypervisor 332 can be configured to replace respective configuration property values of the previous version configuration file with respective customized configuration property values for each of the VCIs 334 to yield the respective customized configuration file for each of the VCIs 334.

The management server 342 can be configured to back up the previous version configuration file and the upgraded configuration file. In some embodiments, the management server 342 can store various configuration files and/or configuration property values for a plurality of VCIs 334. The management server can be configured to provide the backup previous version configuration file to the hypervisor 332 with the upgraded configuration file for the three-way merge.

Figure 4:
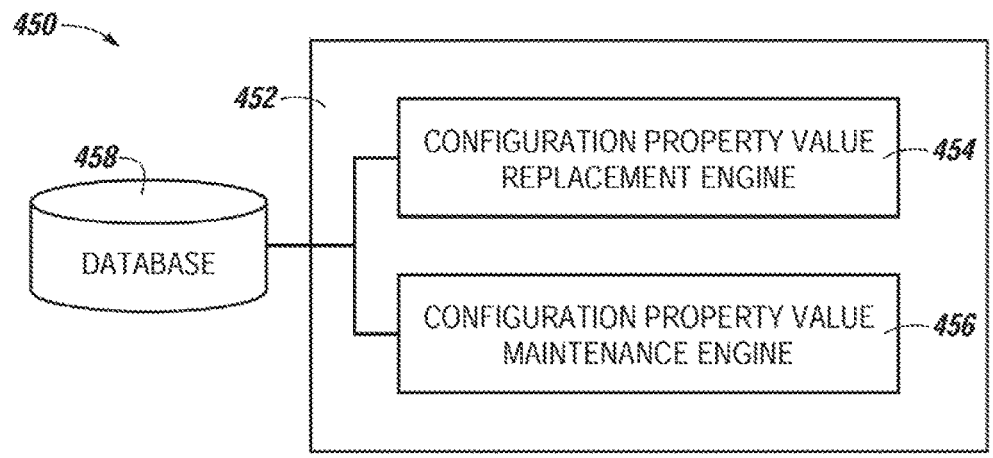
FIG. 4 is a diagram of a system for upgrading a customized configuration file according to a number of embodiments of the present disclosure.

FIG. 4 is a diagram of a system for upgrading a customized configuration file according to a number of embodiments of the present disclosure. The system 450 can include a storage location 458, a subsystem 452, and/or a number of engines, for example configuration property value replacement engine 454 and/or configuration property value maintenance engine 456 and can be in communication with the storage location 458 via a communication link. The system 450 can include additional or fewer engines than illustrated to perform the various functions described herein. The system can represent program instructions and/or hardware of a machine (e.g., machine 560 as referenced in FIG. 5, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the configuration property value replacement engine 454 can include a combination of hardware and program instructions that is configured to replace the customized configuration file with an upgraded configuration file. The configuration property value replacement engine 454 can include a combination of hardware and program instructions that is configured to replace the configuration property value of the upgraded configuration file with the corresponding configuration property value of the customized configuration file in response to the configuration property value of the upgraded configuration file being the same as the corresponding configuration property value of the previous version configuration file and in response to the configuration property value of the upgraded configuration file being different than the corresponding configuration property value of the customized configuration file.

In some embodiments, the configuration property value maintenance engine 456 can include a combination of hardware and program instructions that is configured to maintain a configuration property value of the upgraded configuration file in response to a corresponding configuration property value of the customized configuration file being different than the configuration property value of the upgraded configuration file, a corresponding configuration property value of a previous version configuration file being different than the configuration property value of the upgraded configuration file, and the corresponding configuration property value of the customized configuration file being different thin the corresponding configuration property value of the previous version configuration file.

The configuration property value maintenance engine 456 can include a combination of hardware and program instructions that is configured to maintain the configuration property value of the upgraded configuration file in response to the corresponding configuration property value of the previous version configuration file being the same as the corresponding configuration property value of the customized configuration file and in response to the configuration property value of the upgraded configuration file being different than the corresponding configuration property values of the previous version and the customized configuration files.

The configuration property value maintenance engine 456 can include combination of hardware and program instructions that is configured to maintain the configuration property value of the upgraded configuration file in response to the corresponding configuration property value of the customized configuration file being the same as the configuration property value of the upgraded configuration file. The instructions to maintain the configuration property value of the upgraded configuration file in response to the corresponding configuration property value of the customized configuration file being the same as the configuration property value of the upgraded configuration file further comprise instructions to maintain the configuration property value of the upgraded configuration file regardless of whether the corresponding configuration property value of the previous version configuration file is different than the configuration property value of the upgraded configuration file.

The configuration property value maintenance engine 456 can include a combination of hardware and program instructions that is configured to maintain the configuration property value of the upgraded configuration file in response to an absence of the corresponding configuration property value of the previous version configuration file.

Figure 5:
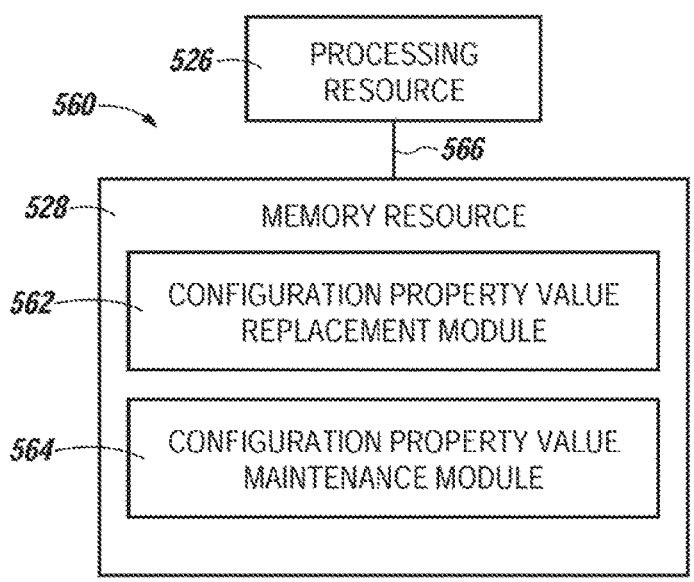
FIG. 5 is a diagram of a machine for upgrading a customized configuration file according to a number of embodiments of the present disclosure.

FIG. 5 is a diagram of a machine for upgrading a customized configuration file according to a number of embodiments of the present disclosure. The machine 560 can utilize software, hardware, firmware, and/or logic to perform a number of functions. The machine 560 can be a combination of hardware and program instructions configured to perform a number of functions (e.g., actions). The hardware, for example, can include a number of processing resources 526 and a number of memory resources 528, such as a machine-readable medium (MRM) or other memory resources 528. The memory resources 528 can be internal and/or external to the machine 560 (e.g., the machine 560 can include internal memory resources and have access to external memory resources). In some embodiments, the machine 560 can be a VCI. The program instructions (e.g., machine-readable instructions (MRI)) can include instructions stored on the MRM to implement a particular function (e.g., an action such as upgrading a customized configuration file). The set of MRI can be executable by one or more of the processing resources 526. The memory resources 528 can be coupled to the machine 560 in a wired and/or wireless manner. For example, the memory resources 528 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 528 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 526 can be coupled to the memory resources 528 via a communication path 566. The communication path 566 can be local or remote to the machine 560. Examples of a local communication path 566 can include an electronic bus internal to a machine, where the memory resources 528 are in communication with the processing resources 526 via the electronic bus. Examples of such electronic buses can include Industry Standard Architecture (ISA), Peripheral Component Interconnect (PCI), Technology Attachment (ATA), Small Computer System Interface (SCSI), Universal Serial Bus (USB), among other types of electronic buses and variants thereof. The communication path 566 can be such that the memory resources 528 are remote from the processing resources 526, such as in a network connection between the memory resources 528 and the processing resources 526. That is, the communication path 566 can be a network connection. Examples of such a network connection can include a local area network (LAN), wide area network (WAN), personal area network (PAN), and the Internet, among others.

As shown in FIG. 5, the MRI stored in the memory resources 528 can be segmented into a number of modules 562, 564 that when executed by the processing resources 526 can perform a number of functions. As used herein a module includes a set of instructions included to perform a particular task or action. The number of modules 562, 564 can be sub-modules of other modules. For example, the configuration property value replacement module 562 can be a sub-module of the configuration property value maintenance module 564 and/or can be contained within a single module. Furthermore, the number of modules 562, 564 can comprise individual modules separate and distinct from one another. Examples are not limited to the specific modules 562, 564 illustrated in FIG. 5.

Each of the number of modules 562, 564 can include program instructions and/or a combination of hardware and program instructions that, when executed by a processing resource 526, can function as a corresponding engine as described with respect to FIG. 4. For example, the configuration property value replacement module 562 can include program instructions and/or a combination of hardware and program instructions that, when executed by a processing resource 526, can function as the configuration property value replacement engine 454 and/or the configuration property value maintenance module 564 can include program instructions and/or a combination of hardware and program instructions that, when executed by a processing resource 526, can function as the configuration property value maintenance engine 456.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features, are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium storing instructions for upgrading a customized configuration file executable by a processing resource to cause a computing system to:
   replace the customized configuration file with an upgraded configuration file;
   maintain a configuration property value of the upgraded configuration file in response to:
      a corresponding configuration property value of the customized configuration file being different than the configuration property value of the upgraded configuration file;
      a corresponding configuration property value of a previous version configuration file being different than the configuration property value of the upgraded configuration file; and
      the corresponding configuration property value of the customized configuration file being different than the corresponding configuration property value of the previous version configuration file; and
   replace the configuration property value of the upgraded configuration file with the corresponding configuration property value of the customized configuration file in response to:
      the configuration property value of the upgraded configuration file being the same as the corresponding configuration property value of the previous version configuration file; and
      the configuration property value of the upgraded configuration file being different than the corresponding configuration property value of the customized configuration file.

2. The medium of claim 1, further including instructions to maintain the configuration property value of the upgraded configuration file in response to:
   the corresponding configuration property value of the previous version configuration file being the same as the corresponding configuration property value of the customized configuration file; and
   the configuration property value of the upgraded configuration file being different than the corresponding configuration property values of the previous version and the customized configuration files.

3. The medium of claim 1, further including instructions to maintain the configuration property value of the upgraded configuration file in response to the corresponding configuration property value of the customized configuration file being the same as the configuration property value of the upgraded configuration file.

4. The medium of claim 3, wherein the instructions to maintain the configuration property value of the upgraded configuration file in response to the corresponding configuration property value of the customized configuration file being the same as the configuration property value of the upgraded configuration file further comprise instructions to:
   maintain the configuration property value of the upgraded configuration file regardless of whether the corresponding configuration property value of the previous version configuration file is different than the configuration property value of the upgraded configuration file.

5. The medium of claim 1, wherein the instructions are executable to maintain the configuration property value of the upgraded configuration file in response to an absence of the corresponding configuration property value of the previous version configuration file.

6. A system for upgrading customized configuration files, comprising:
   a host including processing resources and memory resources;
   a hypervisor incorporated by the host, wherein the hypervisor is configured to execute a plurality of virtual computing instances (VCIs); and
   a management server coupled to the host, the management server is configured to provide an upgraded configuration file to the hypervisor for a guest operating system running on each of the plurality of VCIs, the management server further configured to maintain and distribute software including configuration files for the host and a plurality of other hosts;

wherein the hypervisor is further configured to:
replace a respective customized configuration file with the upgraded configuration file for each of the plurality of VCIs, the respective customized configuration file defining a behavior of the guest operating system; and
perform a respective three-way merge of the upgraded configuration file, a previous version configuration file, and the respective customized configuration file for each of the plurality of VCIs.

7. The system of claim 6, wherein the management server is further configured to:
back up the previous version configuration file and the upgraded configuration file; and
provide the backup previous version configuration file to the hypervisor with the upgraded configuration file for the three-way merge.

8. The system of claim 6, wherein the hypervisor is further configured to replace respective configuration property values of the previous version configuration file with respective customized configuration property values for each of the plurality of VCIs to yield the respective customized configuration file for each of the plurality of VCIs.

9. The system of claim 6, wherein the hypervisor being configured to perform the three-way merge comprises the hypervisor being configured to compare configuration property values of the upgraded configuration file with corresponding configuration property values of a previous version configuration file and the respective customized configuration files.

10. The system of claim 9, wherein the hypervisor is configured to replace a particular configuration property value of the upgraded configuration file with the corresponding configuration property value of the respective customized configuration file for a particular one of the plurality of VCIs in response to:
the particular configuration property value of the upgraded configuration file being the same as the corresponding configuration property value of the previous version configuration file; and
the particular configuration property value of the upgraded configuration file being different than the corresponding configuration property value of the customized configuration file.

11. The system of claim 6, wherein the hypervisor is configured to perform the respective three-way merge by implementing a truth table.

12. A method of upgrading a customized configuration file, comprising:
replacing the customized configuration file with an upgraded configuration file;
comparing configuration property values of the upgraded configuration file with corresponding configuration property values of a previous version configuration file and the customized configuration file;
replacing a first configuration property value of the upgraded configuration file in response to the comparison indicating that:
a first corresponding configuration property value of the previous version configuration file is the same as the first configuration property value of the upgraded configuration file; and
a first corresponding configuration property value of the customized configuration file is different than the first configuration property value of the upgraded configuration file; and
maintaining a second configuration property value of the upgraded configuration file in response to the comparison indicating that:
a second corresponding configuration property value of the previous version configuration file being the same as a second corresponding configuration property value of the customized configuration file; and
the second configuration property value of the upgraded configuration file being different than the second corresponding configuration property values of the previous version and the customized configuration files.

13. The method of claim 12, wherein the method further includes maintaining a third configuration property value of the upgraded configuration file in response to the comparison indicating that:
the third configuration property value of the upgraded configuration file is the same as a third corresponding configuration property value of the customized configuration file; and
the third configuration property value of the upgraded configuration file is different than a third corresponding configuration property value of the previous version configuration file.

14. The method of claim 13, wherein the method further includes maintaining a fourth configuration property value of the upgraded configuration file in response to the comparison indicating that:
a fourth corresponding configuration property value of the customized configuration file is different than the fourth configuration property value of the upgraded configuration file;
a fourth corresponding configuration property value of the previous version configuration file is different than the fourth configuration property value of the upgraded configuration file; and
the fourth corresponding configuration property value of the customized configuration file is different than the fourth corresponding configuration property value of the previous version configuration file.

15. The method of claim 14, wherein the method further includes maintaining a fifth configuration property value of the upgraded configuration file in response to the comparison indicating that:
the fifth configuration property value of the upgraded configuration file is the same as a fifth corresponding configuration property value of the previous version configuration file and the same as a fifth corresponding configuration property value of the customized configuration file.

16. The method of claim 12, wherein the method further includes:
customizing the previous version configuration file after backing up the previous version configuration file;
backing up the customized configuration file prior to replacing the customized configuration file with the upgraded configuration file; and
performing the comparison using the backup of the previous version configuration file, the backup of the customized configuration file, and the upgraded version of the configuration file.

17. The method of claim 16, wherein performing the comparison comprises performing the comparison in runtime of an application that references the customized configuration file.

18. The method of claim 16, wherein customizing the previous version configuration file comprises receiving and setting at least one configuration property value for the configuration file.

* * * * *